(12) United States Patent
Bourke-Dunphy et al.

(10) Patent No.: US 7,945,906 B2
(45) Date of Patent: May 17, 2011

(54) METHOD AND SOFTWARE TOOLS FOR INTELLIGENT SERVICE PACK INSTALLATION

(75) Inventors: Erin M. Bourke-Dunphy, Seattle, WA (US); Jeff A. Zimniewicz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1113 days.

(21) Appl. No.: 11/188,332

(22) Filed: Jul. 25, 2005

(65) Prior Publication Data

US 2005/0265247 A1    Dec. 1, 2005

Related U.S. Application Data

(63) Continuation of application No. 09/726,000, filed on Nov. 29, 2000, now Pat. No. 6,996,815.

(51) Int. Cl.
*G06F 9/44* (2006.01)
*G06F 9/445* (2006.01)

(52) U.S. Cl. ........ 717/168; 717/169; 717/170; 717/174; 717/175

(58) Field of Classification Search .......... 717/168, 717/169, 170, 174, 175
See application file for complete search history.

(56) References Cited

U.S. PATENT DOCUMENTS

| | | | |
|---|---|---|---|
| 5,481,714 A | 1/1996 | Pipkin et al. | |
| 5,586,304 A | 12/1996 | Stupek et al. | |
| 5,666,501 A * | 9/1997 | Jones et al. | 717/177 |
| 5,758,154 A | 5/1998 | Qureshi | |
| 5,761,380 A | 6/1998 | Lewis et al. | |
| 5,828,887 A | 10/1998 | Yeager et al. | |
| 5,950,010 A | 9/1999 | Hesse et al. | |
| 5,966,540 A | 10/1999 | Lister et al. | |
| 6,070,012 A * | 5/2000 | Eitner et al. | 717/168 |
| 6,083,280 A * | 7/2000 | Eitel | 717/158 |
| 6,105,069 A | 8/2000 | Franklin et al. | |
| 6,167,567 A | 12/2000 | Chiles et al. | |
| 6,182,275 B1 * | 1/2001 | Beelitz et al. | 717/175 |
| 6,189,138 B1 | 2/2001 | Fowlow et al. | |
| 6,282,711 B1 | 8/2001 | Halpern et al. | |
| 6,285,932 B1 | 9/2001 | de Bellefeuille et al. | |
| 6,301,707 B1 | 10/2001 | Carroll et al. | |
| 6,314,565 B1 | 11/2001 | Kenner et al. | |
| 6,324,691 B1 | 11/2001 | Gazdik | |
| 6,370,686 B1 | 4/2002 | Delo et al. | |
| 6,374,401 B1 | 4/2002 | Curtis | |
| 6,442,754 B1 | 8/2002 | Curtis | |
| 6,477,703 B1 * | 11/2002 | Smith et al. | 717/175 |

(Continued)

OTHER PUBLICATIONS

Sillitti, et al. "Deploying, Updating, and Managing Tools for Collecting Software Metrics", 2005, ACM, p. 1-4.*

(Continued)

*Primary Examiner* — Wei Y Zhen
*Assistant Examiner* — Qamrun Nahar
(74) *Attorney, Agent, or Firm* — Workman Nydegger (57) ABSTRACT

A software tool and method are provided for selectively installing service packs in a computer system according to dependency information and whether or not an upgrade to an application is scheduled. The method comprises prompting a user for desired setup information and installing the service pack associated with an existing application if the application requires the service pack and if the desired setup information indicates that an upgrade component corresponding to the application is not to be installed. In addition, the service pack is installed if the upgrade component is to be installed and if the service pack is required for upgrading the application.

12 Claims, 6 Drawing Sheets

U.S. PATENT DOCUMENTS

| | | |
|---|---|---|
| 6,493,871 B1 | 12/2002 | MsGuire et al. |
| 6,889,376 B1 * | 5/2005 | Barritz et al. ................ 717/175 |
| 6,996,815 B2 | 2/2006 | Bourke-Dunphy et al. |
| 2004/0015955 A1 | 1/2004 | Bourke-Dunphy et al. |

OTHER PUBLICATIONS

Hicks, et al. "'Dynamic Software Updating", 2005, ACM, p. 1049-1096.*

P. Loshin; "Netscape's Enterprising Server Upgrade", BYTE (International Edition), May 1997, p. 123, vol. 22, No. 5.

A. Harrington; "State of the Art [Windows 2000]", CA Magazine, May 2000, p. 44-45.

F. Hapgood; "Windows of Opportunity [Web Site Tools]", Inc, Dec. 1999, p. 114, 116, 118, 121, 122, 124, 126, 128, vol. 12, No. 17.

K. Kozel; "Corel's Click & Create: It's All in the Game", Emedia Professional, Jan. 1997, p. 92-96, vol. 10, No. 1.

S. Tezuka, et al.; "PC-LAN Construction Support Tool: Easy Installer", Transactions of the Information Processing Society of Japan, Feb. 1996, p. 300-311, vol. 37, No. 2.

Green, "What You Installed Is What You See: Help Navigation in Modular Software Products," Technology & Teamwork, 2000, p. 521-33.

Isazadeh, et al., "A Review of Post-Factum Software Integration Methods," External Technical Report, Oct. 1995, p. 1-16.

Szyperski, "Independently Extensible Systems—Software Engineering Potential and Challenges," 19th Australasian Computer Science Conference, Melbourne, Australia, Jan. 31-Feb. 2, 1996.

K. Fertitta, et al.; "The State of Interchangeability in ATE", IEEE, 2000, p. 417-424.

S. Demetriadis, et al.; "'Graphical' Jogthrough: Expert Based Methodology for User Interface Evaluation, Applied in the Case of an Educational Simulation Interface", ED-MEDIA, 1999, p. 285-299.

H. Nakamishi, et al.; "Object-Oriented Data Handling and OODB Operation of LHD Mass Data Acquisition System", Fusion Engineering and Design, 2000, p. 135-142.

Office Action dated Oct. 6, 2003 cited in U.S. Appl. No. 09/726,000, p. 1-9.

Office Action dated Apr. 6, 2004 cited in U.S. Appl. No. 09/726,000, p. 1-9.

Office Action dated May 16, 2005 cited in U.S. Appl. No. 09/726,000, p. 1-11.

Notice of Allowance dated Sep. 26, 2005 cited in U.S. Appl. No. 09/726,000, p. 1-9.

* cited by examiner

METHOD AND SOFTWARE TOOLS FOR INTELLIGENT SERVICE PACK INSTALLATION

REFERENCE TO RELATED APPLICATIONS

This application is a continuation of co-pending U.S. patent application Ser. No. 09/726,000, filed on Nov. 29, 2000, and entitled, "METHOD AND SOFTWARE TOOLS FOR INTELLIGENT SERVICE PACK INSTALLATION." This application is also related to co-pending U.S. patent application Ser. No. 09/726,111, filed on Nov. 29, 2000, and entitled, "METHOD AND SOFTWARE TOOLS FOR INTELLIGENT OPERATING SYSTEM INSTALLATION." The entireties of the aforementioned applications are hereby incorporated by reference.

TECHNICAL FIELD

The present invention relates generally to computer systems, and more particularly to methods and software tools for intelligent service pack installation.

BACKGROUND

Software applications and/or services are commonly offered to consumers in the form of grouped packages or suites, in which two or more such applications are provided. Such suites are generally provided at a lower cost than the combined cost of the individual applications included therein. In addition, the software suites typically comprise an assortment of related and/or interoperable applications or services targeted to satisfy the software needs of a particular type of customer, such as small businesses. Different applications suites may thus be provided to satisfy various market needs, where certain segments of software consumers commonly require more than one application or service.

The applications included within any particular suite package, as well as the software operating system (OS) residing in a customer's computer system may be revised or improved from time to time, in order to provide new and/or improved features, or to address problems or bugs. Consumers typically are provided with such software revisions through upgrades and/or service packs. For instance, an upgrade may replace an existing software application with a newer version or revision. This may be sold to the customer in various forms, such as a CDROM, or via a download using the Internet, wherein the upgrade may include the new application files and a setup or installation tool which the user employs to remove the old revision and install the new one. Upgrades are usually sold for major revisions of a software application or service.

Service packs are applied to an installed application. The application of a service pack, therefore, provides for revision of an installed application in place on the user's machine, without actually removing the existing code. Service packs are generally employed for minor revisions, such as bug fixes. In making such revisions, whether major or minor, software companies generally try to ensure some level of upward compatibility between products wherever possible. However, complete compatibility or inter-operability between various revisions of a plurality of applications and/or operating systems cannot always be achieved. Thus, a set of dependency requirements typically exist for inter-operability or compatibility between two or more such applications.

The revision dependency issue is of particular importance in the case of integrated software suites, which may comprise several applications. Prior to installing a suite of such applications, there may already be one or more software applications installed on a customer computer system. These pre-existing applications may include previous revisions of one or more applications within the suite. When such a software suite package is to be installed on a customer system, a conventional setup utility will prompt the user to indicate which applications from the suite are to be installed on the machine, and install the applications accordingly. However, there may be dependency problems between one or more of the installed software components and the pre-existing components. For example, a suite may install the latest revision of an operating system, whereas a pre-existing application in the computer system will not operate with the new OS. The customer computer system may thus be left in an inoperative or partially operative state once the setup utility has completed installation of the new OS. Thus, there is a need for improved setup utilities, which reduce or minimize the problems associated with operational dependencies between software components.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later. The invention comprises a software tool and methodology, which address the above mentioned version dependency problems associated with installing software in a computer system.

A software setup tool and methodology are provided for selectively applying service packs in a computer system according to a desired final state for the system. The tool ensures the system will be left in an operable state after the upgrading of certain components and installation of one or more service packs, and avoids needless application of service packs where the user has selected to upgrade one or more applications where the service packs are not required for upgrading. The service pack installer tool may be employed as a component in a suite integration tool kit or other setup utility, which may be used to install and configure a single application or a suite of applications in the computer system. The setup tool user interface prompts the user to select the applications to be installed. According to the selected applications to be installed and the applications currently installed in the computer system, the setup tool determines the desired final system state, and selectively applies service packs as needed in order to install and/or upgrade the desired applications.

The selective application of service packs advantageously avoids applying service packs to resident applications, where the user desires to upgrade the application anyway. The tool thus reduces the time associated with updating one or more applications. The tool further takes into consideration whether a service pack is required for upgrading an application in determining whether to apply the service pack prior to upgrading. Thus, a service pack may be applied or installed if the user has chosen not to upgrade the associated application. Alternatively, the service pack may be installed if the user has chosen to upgrade the application and the service pack is required for upgrading the application.

In making the determination of which service packs to apply, the tool may consult a data store including information on dependencies, for example, including whether a given service pack is required in order to upgrade an application residing on the computer system. The setup tool may further determine the availability of additional or secondary service packs associated with an application. For example, the tool may consult an Internet website to determine if later service packs are available than were included within the setup tool or upgrade kit. In this manner, the user may be provided with a more updated suite installation.

In accordance with one aspect of the present invention, there is provided a software setup tool for selectively upgrading applications and selectively installing service packs in a computer system. The setup tool comprises a user interface component which prompts a user for desired setup information relating to the computer system. The tool further comprises one or more application upgrade components, and a data store having dependency information. In addition, a service pack installation component is provided to selectively install one or more service packs associated with applications residing in the computer system according to the desired setup and the dependency information. The tool thus installs service packs only when necessary according to the desired final state of the computer system. For example, where an application is to be upgraded by the setup, the tool may refrain from installing an associated service pack unless required for the upgrade.

The dependency information may indicate whether one or more applications residing in the computer system require service packs, and the setup information may indicate whether one or more application upgrade components are to be installed. The service pack installation component may selectively install service packs if the dependency information indicates that an application in the system requires a service pack and the setup information indicates that the application is not to be upgraded. In addition, the dependency information may further indicate that the application upgrade component requires a service pack, in which case the service pack installation component may install the at least one service pack if the upgrade component is to be installed. The user interface may also prompt the user to accept or refuse installation of the service pack.

The software setup tool may also selectively determine the availability of one or more additional service packs associated with applications residing in the computer system. In this manner, the latest software fixes may be provided to a customer computer system, for example, through the setup tool consulting an Internet website to obtain service packs created or otherwise made available after the setup tool was shipped.

In accordance with another aspect of the invention, there is provided a method of installing service packs in a computer system, which minimizes the likelihood of unnecessary service pack installation according to the desired final machine state. The method comprises providing dependency information relating to one or more service packs, prompting the user for desired setup information, and selectively installing service packs associated with application components in the computer system according to the desired setup information and the dependency information.

The selective service pack installation may comprise installing a service pack if the corresponding application component requires the service pack according to the dependency information, and if the desired setup information indicates that the application is not to be upgraded. In addition, the service pack installation may comprise installing the service pack if the application requires the service pack for upgrading, and if the desired setup information indicates that the application is to be upgraded. The method may also comprise selectively installing one or more application upgrade components in the computer system according to the desired setup information. In addition, the method may comprise determining the availability of one or more additional service packs, for example, by consulting an Internet website.

According to yet another aspect of the invention, a computer-readable medium is provided having computer-readable instructions for prompting a user for desired setup information relating to a desired setup for the computer system, and installing a service pack associated with an application residing in the computer system if the application requires the service pack and if the desired setup information indicates that an upgrade component corresponding to the application is not to be installed. Further computer-readable instructions may be provided for installing the service pack if the upgrade component is to be installed and if the service pack is required for upgrading the application.

According to yet another aspect of the invention, there is provided a software setup tool for selectively installing service packs in a computer system, comprising an interface for prompting a user for desired setup information relating to a desired setup for the computer system, and a service pack installation component for installing a service pack associated with an application or other software component residing in the computer system if the application requires the service pack and if the desired setup information indicates that an upgrade component corresponding to the application is not to be installed. The service pack installation component may also be adapted to install the service pack if the upgrade component is to be installed and if the service pack is required for upgrading the application.

According to still another aspect of the invention, there is provided a software tool for selectively upgrading at least one application, comprising a component for structuring a service pack installable on the system, the structuring being based at least upon application setup parameters and application dependency parameters. Another aspect of the invention is a system for selectively upgrading at least one application, comprising a first component for interrogating a computer system to identify installed software, and a second component for structuring a service pack installable on the system, the structuring being based at least upon application setup parameters and application dependency parameters. Still another aspect of the invention is a data packet adapted to be transmitted between at least two processes, comprising a component for structuring a service pack installable on the system, the structuring being based at least upon application setup parameters and application dependency parameters.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

Referring now to the drawings, the present invention comprises a software tool and methodology whereby service packs may be selectively installed in a computer system according to dependency information and whether or not an upgrade to an application is scheduled. The invention avoids unnecessary installation of service packs as well as ensures that the user's computer system will be in a functional state at the end of setup, thereby providing significant advantages over prior tools and methods.

Figure 1:
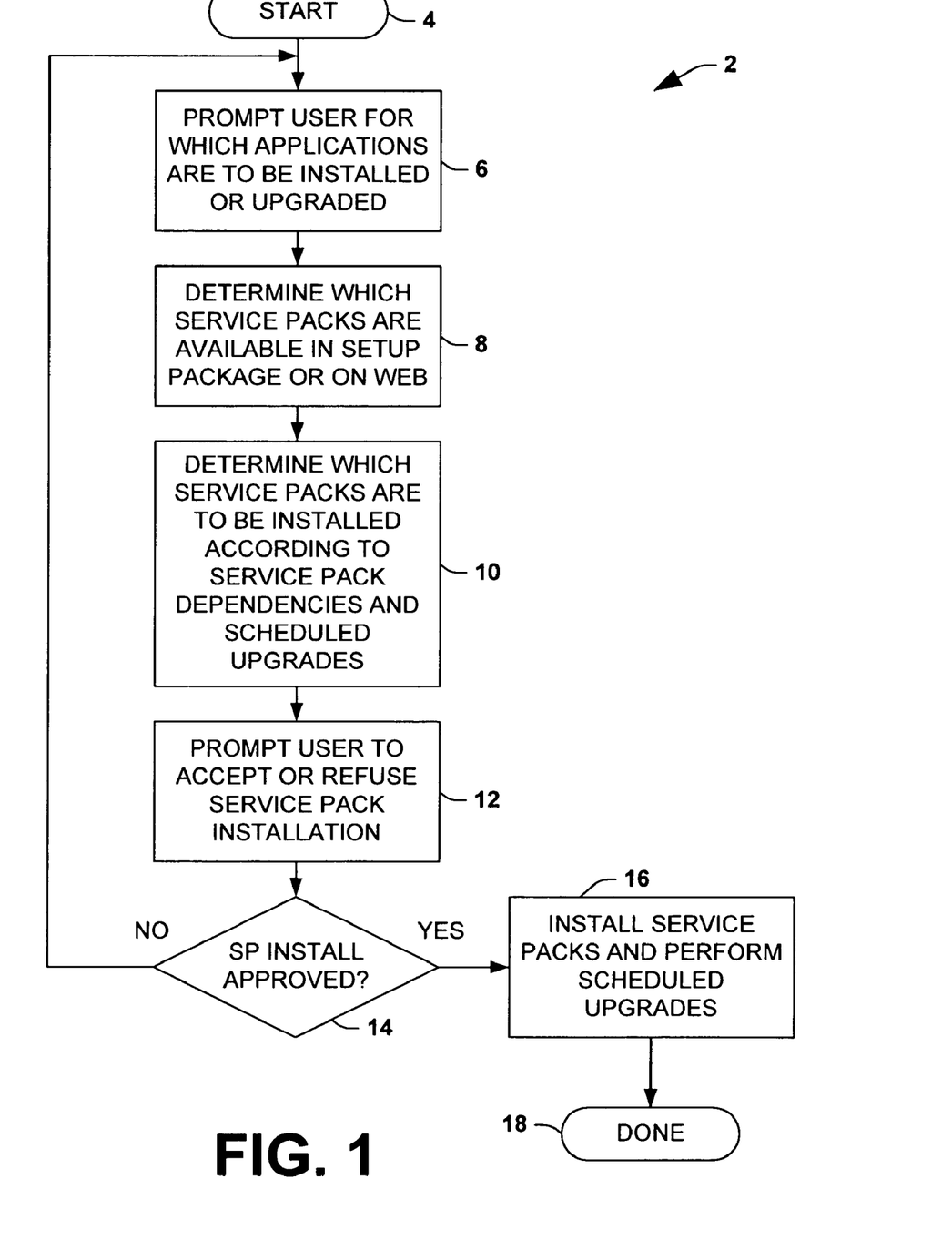
FIG. 1 is a flow diagram illustrating an exemplary method in accordance with an aspect of the present invention.

Referring to FIG. 1, an exemplary method 2 is illustrated for selectively installing service packs in a computer system. Although the method of FIG. 1 is illustrated and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect of the present invention.

The method 2 may be implemented in a variety of setup, installation, and/or upgrade operations, and will be described in association with a setup operation for an application suite comprising two or more applications and/or operating systems. Beginning at step 4, a user is prompted for setup information at step 6, such as which applications are to be installed or upgraded in the computer system. As illustrated and described in greater detail hereinafter, the user may be prompted for such information via a user interface component in a software setup tool, for example, a graphical or other type of user interface with which the user selects one or more applications from a listing of applications available in the suite.

Proceeding at step 8, the software tool determines which service packs are available for use in the setup operation. The service packs may be obtained from the setup package itself and/or from a secondary source, for example, from a web site. This allows the most recent service packs to be provided to the user according to the desired setup information, as well as dependency information provided in the setup tool. For example, where a setup package includes service pack number 2 for a given application, the software tool may consult a web site and discover that service pack 3 for the application is now available, and accordingly obtain the newer service pack via a download operation. In this manner, the user is provided with the latest service pack regardless of the relative age of the setup package.

The method 2 continues at step 10 by determining which service packs are to be installed according to dependency information such as service pack dependencies. Such dependencies may indicate interoperability requirements for two or more software components (e.g., version compatibility between two applications, or between an application and an operating system). For example, the dependency information may indicate that a first application currently installed in the user computer system requires service pack number 3 to run properly on a particular operating system, and further that a second application upgrade requires a particular operating system to run. The service packs to be installed are further determined according to the scheduled upgrades. Proceeding with the above example, where the user prompted desired setup information indicates that the user wants to upgrade the second application (e.g., which requires the Windows 2000 operating system), the software setup tool may determine that the operating system must be upgraded to Windows 2000 to accommodate the upgrade of the second application, and further that service pack number 3 must be installed with respect to the first application.

Proceeding to step 12, the method 2 may further prompt the user to accept or refuse service pack installation. For example, the user may be presented (e.g., via a user interface component of the setup tool) with a listing of the service packs which the software tool has determined should be installed in the computer system. The user may then decide whether to proceed with the service pack installation or to return to a previous interface rendering. This provides the user with information relating to the changes to the system before they are made. Thus, at decision step 14, the tool determines whether the user has approved or refused service pack installation. If not, the method 2 may return to step 6, whereat the user may change the previously made application installation selections and again proceed through method steps 6-12, as described above.

If the user accepts the proposed service pack installation at decision step 14, the method 2 proceeds to step 16, where the appropriate service packs are installed (e.g., according to the desired setup information and the dependency information), and any scheduled upgrades are performed. Thus, per the above example, service pack number 3 may be installed with respect to the first application (e.g., to allow this application to run properly with the new operating system). In addition, the operating system and the second application may then be upgraded in accordance with the desired setup and dependency information. The user computer system is thus ensured of being left in an operational state after the operation of the setup tool is completed.

It will be noted at this point, that the tool may further advantageously avoid unnecessary service pack installation according to the dependency and desired setup information. For instance, in the example above, a previous version of the second application may have been resident on the user computer system, for example, version 2. The setup package may comprise a service pack adapted to provide bug fixes for version 2 of the second application. However, the application upgrade component selected by the user for installation (e.g., via prompting by a user interface component) may upgrade the second application to version 4 (e.g., which addresses the bugs in version 2). The software setup tool may thus determine that installation of the available service pack for the second application is unnecessary, as this application will be upgraded to version 4 in accordance with the method 2.

Thus, the use of the dependency information and the desired setup information allows intelligent service pack installation to avoid installation of unneeded service packs according to the desired final state of the user computer system. Moreover, the tool may use the dependency information according to the method 2 to selectively install one or more service packs to an application which is to be upgraded, for example, where the dependency information indicates that the service pack is required in order to upgrade the application.

Figure 2:
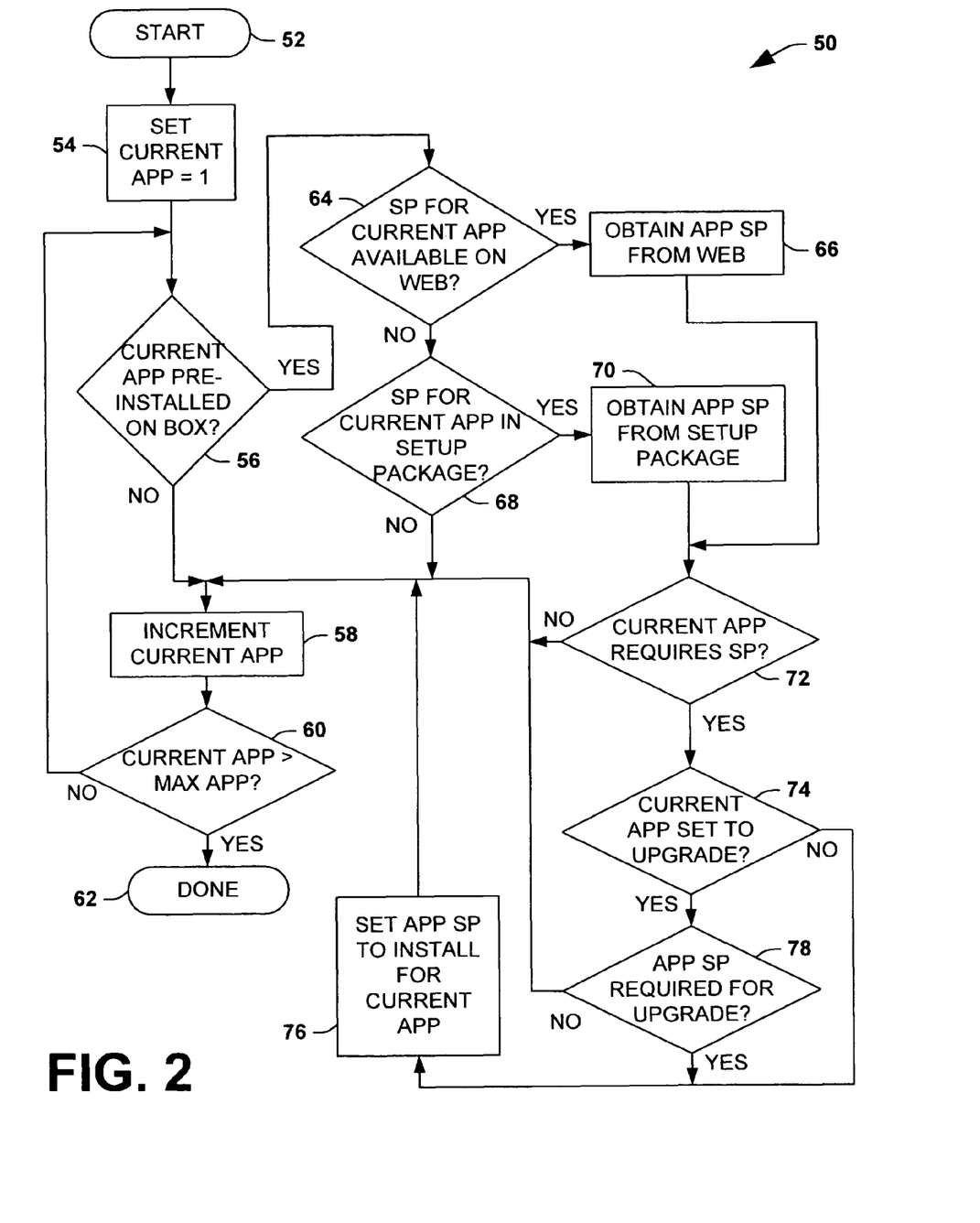
FIG. 2 is a flow diagram illustrating another exemplary method accordance with the invention.

Referring now to FIG. 2, another method 50 illustrates further aspects of the invention, which provide for selective service pack installation according to desired setup and dependency information. As with the method 2 of FIG. 1 above, the method 50 of FIG. 2 is illustrated and described as a series of steps. However, it will be appreciated that the present invention is not limited by the order of the illustrated steps, and that some steps may, in accordance with the present invention, occur in different orders and/or concurrently with other steps from that shown and described herein. Moreover, not all illustrated steps may be required to implement a methodology in accordance with an aspect of the present invention. The method 50 of FIG. 2 may be employed to selectively install one or more service packs as part of a setup tool in which upgrade components may also be selectively installed, and in which user prompting of desired setup information is performed. However, it will be appreciated that the method 50 finds application in association with systems and methodologies apart from those specifically illustrated and described herein.

The method 50 is described hereinafter in the context of a setup tool wherein a plurality of application components may be selectively installed or upgraded according to user prompted desired setup information, and which tool may further comprise one or more service packs associated with one or more applications residing on the user computer system, although other applications of the method 50 are contemplated as falling within the scope of the present invention. Beginning at step 52, a current application counter (CURRENT APP) is set to 1 at step 54. This counter may be used to increment through the applications associated with the setup tool, such as a suite of applications, to determine availability of associated service packs, and to selectively determine which (if any) of such service packs are to be installed according to the desired setup information and dependency information.

At step 56, the method 50 determines whether the current application (e.g., application number 1) has been previously installed (e.g., is pre-existing) on the user computer system. If not, the current application counter CURRENT APP is incremented at step 58, after which the counter is compared with a maximum value (MAX APP) at decision step 60. If the maximum value for the counter has been reached (e.g., CURRENT APP>MAX APP), the method 50 is completed at step 62. Otherwise, the method 50 returns to step 56, where a determination is made as to whether the next application (e.g., application number 2) is resident on the user system.

If so, the method 50 proceeds to decision step 64, whereat the availability of a service pack associated with the current application is verified, for example, by consulting an Internet web site or other source separate from the setup package. If available, the service pack is obtained from the web site at step 66. Otherwise, a determination is made as to whether a service pack associated with the current application is available from the setup package at decision step 68. If a service pack is available, it is obtained at step 70. If no service pack is available for the current application at steps 64 and 68, the method 50 proceeds to step 58 whereat the current application counter is incremented, as described above. At this point, it will be noted that the methodology of the present invention may, but need not, be implemented by obtaining service packs from a secondary source (e.g., from a web site via steps 64 and 66). However, as pointed out above, the consultation of such a secondary source may be advantageously employed to ensure the user gets the latest available service pack.

If a service pack is obtained at step 66 or 70, the method 50 proceeds to decision step 72, whereat a determination is made as to whether the current application requires the service pack. If the available service pack is not required by the current application, the method 50 returns to step 58, as described above. However, if the current application requires the available service pack, the method 50 proceeds to step 74. The determination at step 72 may be made, for example, according to dependency information associated with the current application. For instance, the software tool implementing the method 50 may determine that version 2 of the current application is currently installed in the user computer system, and the dependency information may indicate that an available service pack provides bug fixes for version 2 of the current application.

At decision step 74, a determination is made as to whether the current application is scheduled for upgrade. For example, the determination at step 74 may be made according to the desired setup information prompted via a user interface, such as a prompt screen wherein the user selects which applications to install or upgrade from a list of applications available in a suite, as illustrated and described hereinafter with respect to FIG. 3. If the current application requires the available service pack as determined at step 72 and the current application is not scheduled to be upgraded, the service pack is set or scheduled for installation at step 76, after which the application counter is incremented at step 58.

If the current application is scheduled for upgrade (e.g., according to the desired setup information), the method proceeds to decision step 78. There, the method 50 determines whether the service pack is required for upgrading the current application in the user computer system (e.g., according to the dependency information). If so, the service pack is scheduled for installation at step 76. If not required for the scheduled upgrading of the current application, the service pack will not be installed, and the method 50 returns to step 58 for processing of any remaining applications. The method may thus proceed until all of the applications available in the setup package have been thus processed. Thus, the method 50 selectively provides for installation of service packs according to the desired setup and dependency information, whereby unnecessary service pack installation is avoided and the user system is ensured of being left in an operational state following the setup operation.

It will be further noted that the invention may comprise determining whether or not to install one or more service packs according to compatibility characteristics associated with any application and/or operating systems residing on the user system, regardless of whether the setup package includes upgrade versions of those applications or service packs associated therewith. For instance, the methods and tools of the invention may determine the existence of a software component (e.g., an application or operating system) in the system, and consult a secondary source (e.g., an Internet website) and determine that a service pack is available therefor. The tool may then obtain the service pack and schedule it for installation according to the dependency information and desired setup information. The tool may thus proceed to enquire as to service pack availability of one, some, or all applications residing in the system, regardless of whether or not the setup package has components related thereto.

As described with respect to the method 2 of FIG. 1, the user may be subsequently prompted to accept or refuse such service pack installation, prior to actual installation thereof onto the system. It will be further recognized that the invention may be employed with any software component, and is not limited to application and operating system components. With respect to the installation of the scheduled service packs, moreover, the dependency information may be further employed to determine ordering of such installation where applicable or otherwise appropriate. For instance, if a particular service pack is required for upgrading a component, the service pack may be installed prior to the component upgrade (e.g., prior to installing the new version of the component), whereas a service pack required for compatibility reasons may be installed following the installation of upgrade components. The methods of the invention thus provide for installing service packs and/or other types of software components in a computer system via obtaining (e.g., prompting a user for) desired setup information relating to a desired setup for the computer system, and installing a service pack associated with an application or other software component residing in the computer system if the application requires the service pack and if the desired setup information indicates that an upgrade component corresponding to the application is not to be installed. Moreover, the invention comprises installing the service pack if the upgrade component is to be installed and if the service pack is required for upgrading the application.

Figure 3:
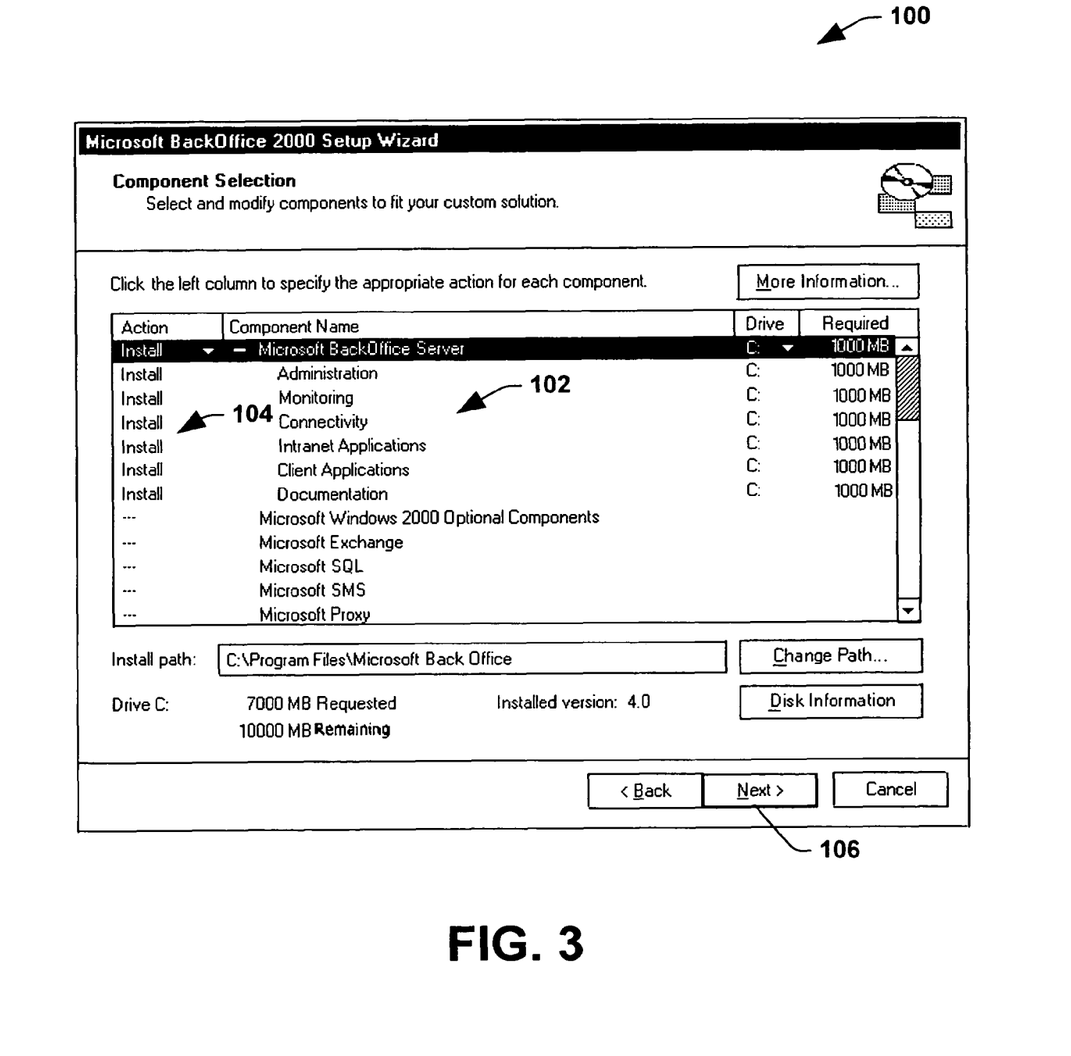
FIG. 3 is a front elevation view of an exemplary user interface adapted to prompt a user for setup information in accordance with the invention.

Referring now to FIG. 3, an exemplary user interface component 100 is illustrated, whereby a user may be prompted for desired setup information in accordance with an aspect of the invention. The interface component 100 comprises a component selection screen having a listing 102 of applications, operating systems, and/or other types of software components. The component 100 is adapted to allow a user to select one or more of the listed components for installation and/or upgrading via clicking on listed items using a selection device such as a mouse, keyboard (not shown) or via a voice or other command. The desired action is indicated for individual objects within the listing 102 via associated action indicia 104. Through interaction with the user interface component 100, the user may provide desired setup information, which may be advantageously employed in association with the methods and software tools of the invention, as illustrated and described herein.

Figure 4:
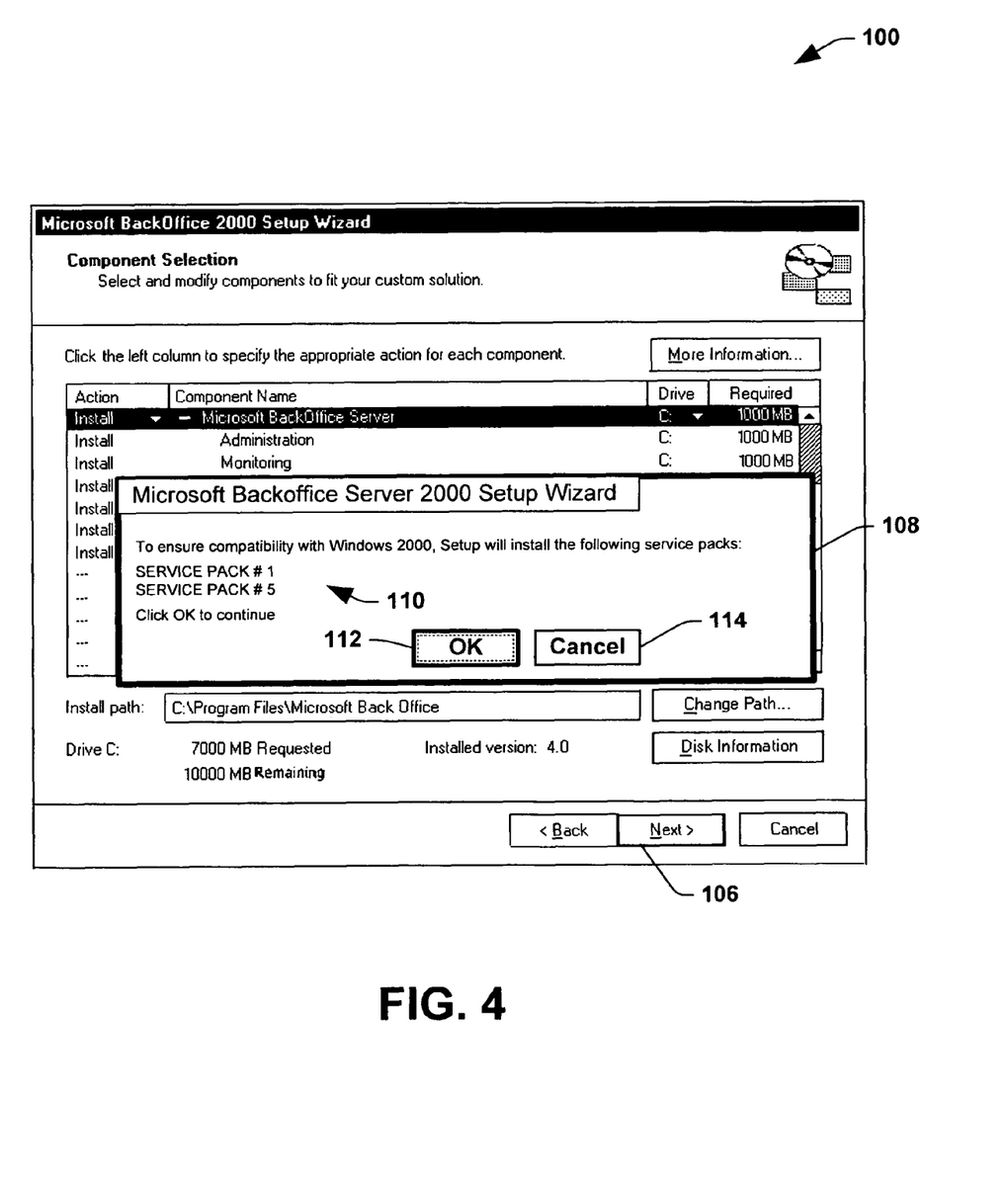
FIG. 4 is a front elevation view further illustrating the interface of FIG. 3.

The selective installation of service packs according to the invention may be initiated, for example, by the user activating a next activator component 106, whereafter the setup tool may selectively install one or more service packs in a user computer system according to the desired final state of the system (e.g., desired setup information) as well as dependency information, as described above. Referring also to FIG. 4, prior to installation of one or more service packs, the user may be prompted by the interface component 100 to selectively accept or refuse installation thereof, for example, using the exemplary pop up screen 108. The screen 108 provides an indication to the user of the service pack or packs scheduled or set for installation, for example, via a service pack list 110. The user may selectively accept the proposed service pack installation using an OK activator component 112 or refuse such installation using a Cancel activator component 114, for example, using a mouse or other actuation device (e.g., keyboard, voice command, or the like).

In accordance with another aspect of the invention, a software setup tool is provided for selectively installing service packs in a computer system, which comprises an interface for prompting a user for desired setup information relating to a desired setup for the computer system, as well as a service pack installation component adapted to install a service pack associated with a software component residing in the computer system if the software component requires the service pack and if the desired setup information indicates that an upgrade component corresponding to the software component is not to be installed. The tool may further install the service pack if the upgrade component is to be installed and if the service pack is required for upgrading the software component. It will be appreciated that while the software tools and service pack installation components of the invention may advantageously implement one or more of the methodologies described herein, that the software components of the invention are not limited to implementing these methodologies.

Figure 5:
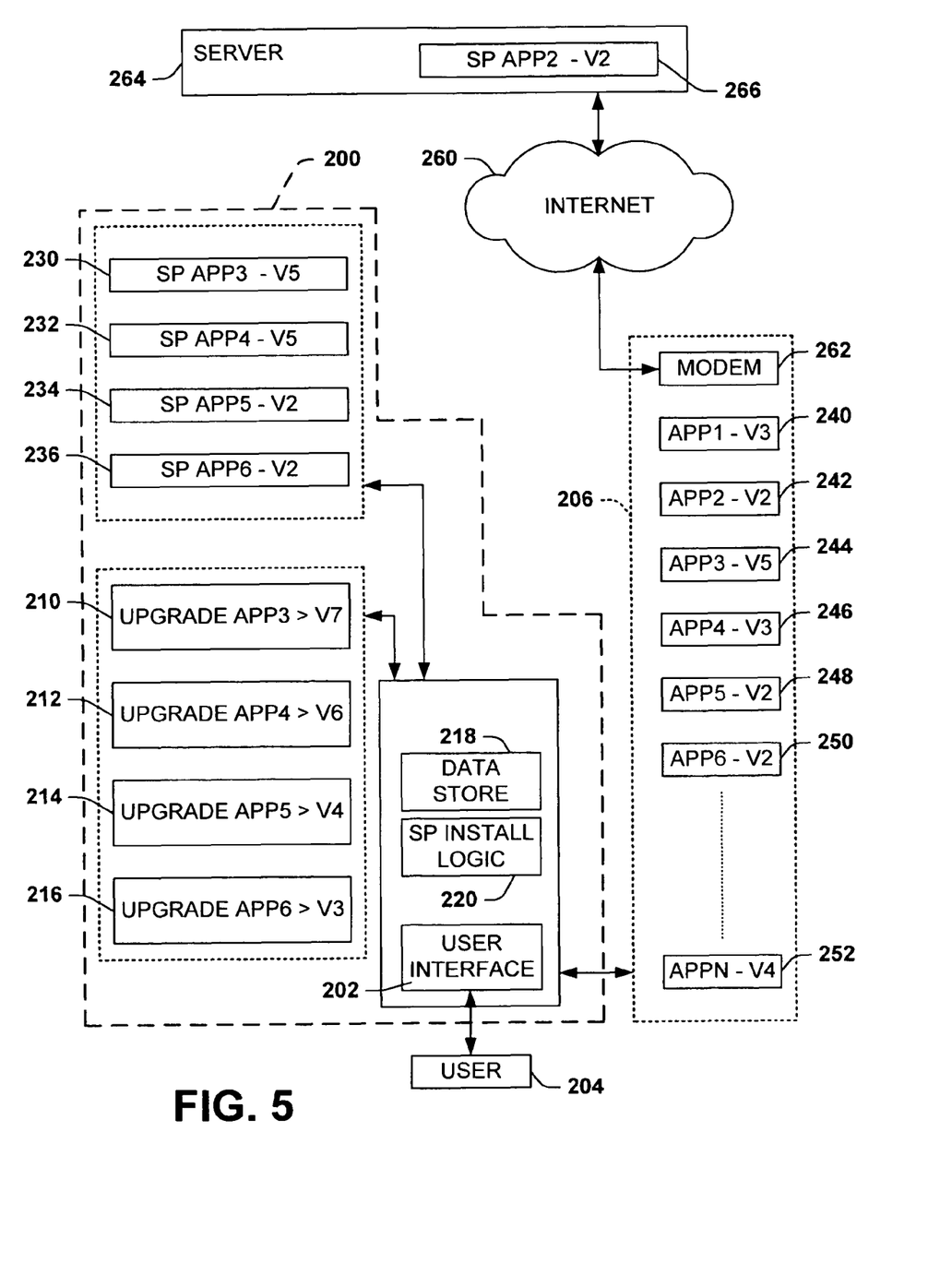
FIG. 5 is a schematic diagram illustrating an exemplary software setup tool in accordance with another aspect of the invention.

An exemplary software setup tool 200 in accordance with the invention is illustrated in FIG. 5. The tool 200 may comprise a user interface component 202 adapted to prompt a user 204 for desired setup information relating to a desired setup for a computer system 206. The tool 200 further comprises one or more application upgrade components 210, 212, 214, and 216, and a data store 218 comprising dependency information, such as compatibility information related to one or more software components within the computer system 206 and/or the tool 200. A service pack installation component 220 is included in the tool 200, which is adapted to selectively install one or more of the service packs 230, 232, 234, and 236 associated with one or more software components according to the desired setup information and the dependency information.

The service packs 230, 232, 234, and 236 may be associated with one or more of the application upgrade components 210, 212, 214, and 216 in the tool 200, and/or with one or more software components 240, 242, 244, 246, 248, 250, and/or 252 residing in the computer system 206. For example, the service pack 230 may be a service pack associated with software component 244, which includes application program number 3. The service pack 230 may, for example, be designed to rectify bugs in version 5 of software component 244 (application number 3).

The application upgrade components 210, 212, 214, and 216 in the tool 200, moreover, may be related to one or more of the software components 240, 242, 244, 246, 248, 250, and/or 252 residing in the computer system 206. For example, the application upgrade component 210 may be an upgrade for software component 244 (application number 3), wherein component 210 is adapted to upgrade application number 3 to version 7.

The setup tool 200 may prompt the user 204, via user interface 202 (e.g., using the exemplary user interface component 100 of FIGS. 3 and 4) to select one or more of the application upgrade components 210, 212, 214, and 216 to be installed in the computer system 206. For instance, the user 204 may decide to upgrade software components 244 (application number 3) and 250 (application number 6), and elect not to upgrade components 246 (application number 4) and 248 (application number 5).

With this desired setup information and the dependency information in the data store 218, the service pack installation component 220 may selectively install one, some, or all of the service packs 230, 232, 234, and 236 accordingly, in order to avoid unnecessary service pack installation and to leave the computer system 206 in a functional state. In addition, or in combination, the tool 200 may be adapted to access the Internet 260 using the modem 262 of the computer system 206, and to determine the availability of one or more secondary service packs. For example, a website server 264 may make service pack 266 (e.g., designed to provide bug fixes for version 2 of application number 2) available to the tool 200.

Continuing with the preceding example, the service pack installation component 220 may be launched via the user interface component 202 (e.g., via the user actuating the next activator component 106 of FIGS. 3 and 4), and may determine that although service pack 230 is available for fixing bugs in the software component 244 (version 5 of application number 3), that installation of the service pack 230 is rendered unnecessary because the user 204 has chosen to upgrade component 244 via installation of the upgrade component 210, which will upgrade the application to version 7. Thus according to the desired setup information and the dependency information of data store 218, the service pack 230 will not be scheduled for installation.

The service pack installation component 220 may further determine that service pack 234 is required for fixing bugs in the pre-existing software component 248 (version 2 of application number 5) according to the dependency information in data store 218. Because the user 204 has elected not to upgrade the component 248 (according to the desired setup information), the service pack 234 will be scheduled for installation. In addition, the component 220 may consult the dependency information in data store 218 and determine therefrom that the service pack 236 is required to upgrade the software component 250 (version 2 of application number 6) using upgrade component 216, as desired by the user 204.

Furthermore, although the exemplary tool 200 includes no service pack (and no upgrade component) associated with the software component 242 (version 2 of application number 2) on the system 206, the tool 200 may advantageously obtain the service pack 266 associated therewith, and schedule the service pack 266 for installation onto the system 206. Although the installation of this service pack 266 may not be anticipated by the user 204 (e.g., because no upgrade of the software component 242 was offered in the initial upgrade selection prompting of user interface component 202), the interface component may further prompt the user 204 to accept or refuse installation of the scheduled service packs.

While the above examples have illustrated and described the invention in the context of installing service packs and upgrade components associated with various application programs, it will be appreciated that service packs and/or upgrade components associated with other types of software components (e.g., operating systems) may be advantageously selectively installed according to desired setup information and dependency information, within the scope of the present invention. Furthermore, it will be appreciated that while the data store 218 of FIG. 5 is illustrated as being a component of the tool 200, other variations of the invention are possible in which dependency information may be obtained alternatively or in combination from a secondary data store (e.g., via consulting the server 264 via the Internet 260.

Figure 6:
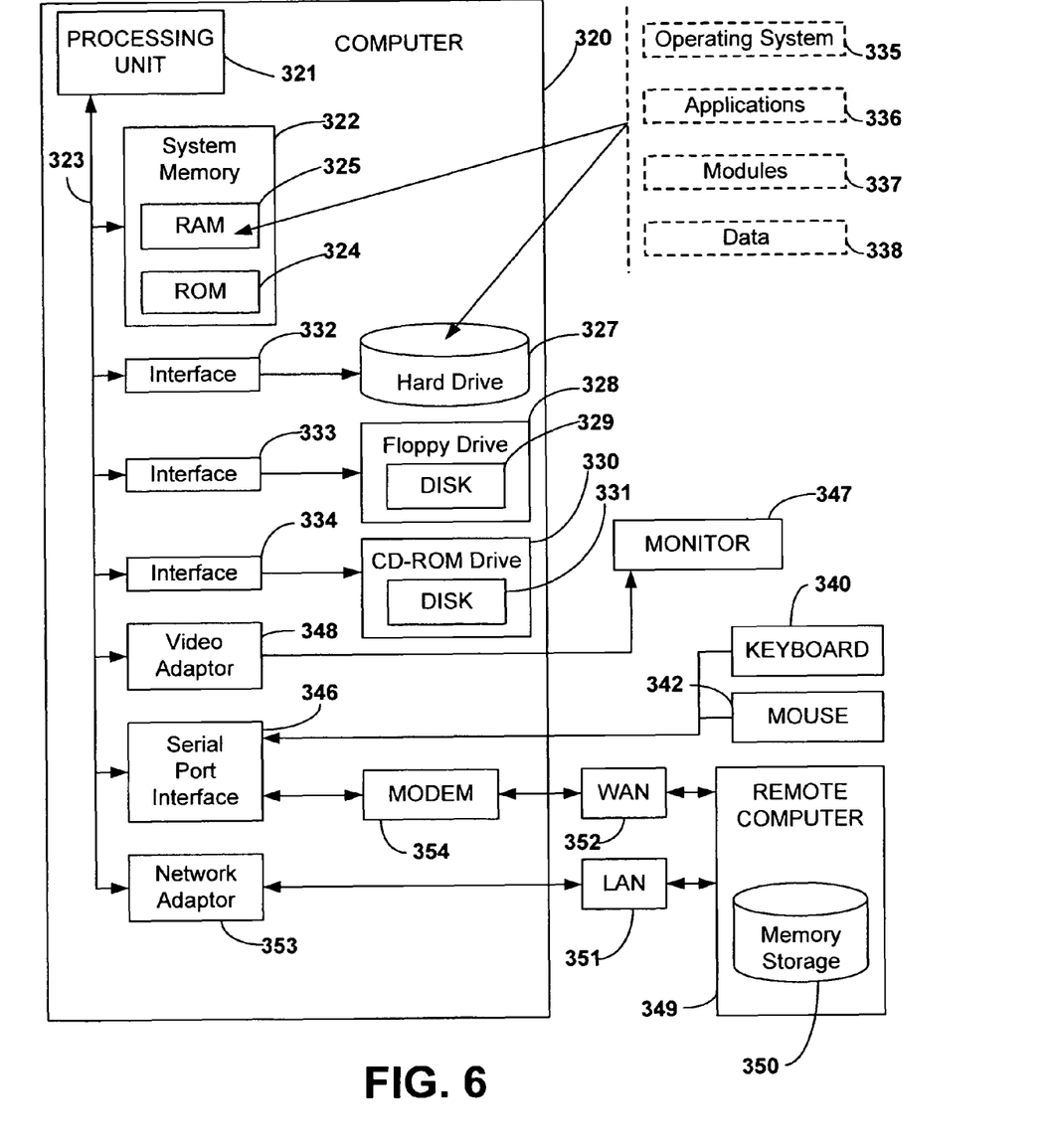
FIG. 6 is a schematic block diagram of an exemplary operating environment in which one or more aspects of the invention may be implemented.

In order to provide a context for the various aspects of the invention, FIG. 6 and the following discussion are intended to provide a brief, general description of a suitable computing environment in which the various aspects of the present invention may be implemented. While the invention has been described above in the general context of software tools and computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary environment for implementing various aspects of the invention includes a computer 320, including a processing unit 321, a system memory 322, and a system bus 323 that couples various system components including the system memory to the processing unit 321. The processing unit 321 may be any of various commercially available processors, including but not limited to Intel x86, Pentium®, and compatible microprocessors from Intel and others, including Cyrix, AMD and Nexgen; Alpha®, from Digital; MIPS®, from MIPS Technology, NEC, IDT, Siemens, and others; and the PowerPC®, from IBM and Motorola. Dual microprocessors and other multi-processor architectures also can be used as the processing unit 321.

The system bus 323 may be any of several types of bus structure including a memory bus or memory controller, a peripheral bus, and a local bus using any of a variety of conventional bus architectures such as PCI, VESA, Micro-channel, ISA, and EISA, to name a few. The computer memory may include read only memory (ROM) 324 and random access memory (RAM) 325. A basic input/output system (BIOS), containing the basic routines that help to transfer information between elements within the computer 320, such as during start-up, is stored in ROM 324.

The computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable storage media provide nonvolatile storage of data, data structures, computer-executable instructions, etc. for the computer 320.

Although the description of computer-readable storage media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention. However, computer-readable storage media do not encompass signals, carrier waves, or wireless.

A number of program modules may be stored in the drives and RAM 325, including an operating system 335, one or more application programs 336, other program modules 337, and program data 338. The operating system 335 in the illustrated computer is, for example, the "Microsoft Windows NT" operating system, although it is to be appreciated that the present invention may be implemented with other operating systems or combinations of operating systems, such as UNIX, LINUX etc.

A user may enter commands and information into the computer 320 through a keyboard 340 and a pointing device, such as a mouse 342. Other input devices (not shown) may include a microphone, an IR remote control, a joystick, a game pad, a satellite dish, a scanner, or the like. These and other input devices are often connected to the processing unit 321 through a serial port interface 346 that is coupled to the system bus 323, but may be connected by other interfaces, such as a parallel port, a game port, a universal serial bus ("USB"), an IR interface, etc. A monitor 347 or other type of display device is also connected to the system bus 323 via an interface, such as a video adapter 348. In addition to the monitor, a computer typically includes other peripheral output devices (not shown), such as speakers, printers etc.

The computer 320 may operate in a networked environment using logical connections to one or more remote computers, such as a remote computer(s) 349. The remote computer(s) 349 may be a workstation, a server computer, a router, a personal computer, microprocessor based entertainment appliance (e.g., a WebTV client system), a peer device or other common network node, and typically includes many or all of the elements described relative to the computer 320, although, for purposes of brevity, only a memory storage device 350 is illustrated. The logical connections depicted include a local area network (LAN) 351 and a wide area network (WAN) 352. Such networking environments are commonplace in offices, enterprise-wide computer networks, intranets and the Internet.

When used in a LAN networking environment, the computer 320 is connected to the local network 351 through a network interface or adapter 353. When used in a WAN networking environment, the computer 320 typically includes a modem 354, or is connected to a communications server on the LAN, or has other means for establishing communications over the WAN 352, such as the Internet. The modem 354, which may be internal or external, is connected to the system bus 323 via the serial port interface 346 (e.g., for communications over POTS). The modem 354, alternatively, may be connected to the system bus 323 via the network interface or adapter 353 (e.g., for communication over DSL, cable, satellite, etc.). In a networked environment, program modules depicted relative to the computer 320, or portions thereof, may be stored in the remote memory storage device 350. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A computer readable storage medium having stored thereon computer executable components for selectively installing service packs in a computer system, comprising:
   a user interface component for receiving user input to a computer system that instructs the computer system to commence an upgrade operation for a software suite, the software suite comprising two or more applications, the upgrade operation upgrading at least one of the two or more applications on the computer system; and
   a service pack installation component that performs the following steps to intelligently install service packs during the upgrade operation:
      determines that one or more service packs is available for at least one of the two or more applications;
      determines whether to install the one or more service packs during the upgrade operation, by performing one of the following:
      determines that a service pack, that is available for a first application in the software suite, is required for the first application to interact with the version of a second application in the software suite to which the second application will be upgraded by the upgrade operation, installing the service pack to the first application, and performing the upgrade operation where the first application is not upgraded by the upgrade operation, instead the first application is upgraded by the service pack installation; or
      determines that a service pack, that is available for a first application in the software suite, fixes a problem that is also fixed by the version of the first application to which the first application will be upgraded by the upgrade operation, selecting not to install the service pack to the first application, and performing the upgrade operation where the first application is upgraded by the upgrade operation and the first application is not upgraded by the service pack installation.

2. The computer readable storage medium of claim 1, wherein the service pack installation component further performs the following steps:
   determines that a service pack is available for the operating system of the computer system;
   determines that at least one of the two or more applications require the operating system to have the service pack installed to run on the computer system; and
   installs the service pack to the operating system during the upgrade operation.

3. The computer readable storage medium of claim 1, wherein the service pack installation component consults an Internet website to determine the availability of the one or more service packs.

4. The computer readable storage medium of claim 1, wherein the user interface component prompts the user to accept or refuse installation of the one or more service packs.

5. A method of installing service packs in a computer system, comprising:
  receiving user input to a computer system that instructs the computer system to commence an upgrade operation for a software suite, the software suite comprising two or more applications, the upgrade operation upgrading at least one of the two or more applications on the computer system;
  determining that one or more service packs is available for at least one of the two or more applications;
  determining whether to install the one or more service packs during the upgrade operation, by performing one of the following:
    determining that a service pack, that is available for a first application in the software suite, is required for the first application to interact with the version of a second application in the software suite to which the second application will be upgraded by the upgrade operation, installing the service pack to the first application, and performing the upgrade operation where the first application is not upgraded by the upgrade operation, instead the first application is upgraded by the service pack installation; or
    determining that a service pack, that is available for a first application in the software suite, fixes a problem that is also fixed by the version of the first application to which the first application will be upgraded by the upgrade operation, selecting not to install the service pack to the first application, and performing the upgrade operation where the first application is upgraded by the upgrade operation and the first application is not upgraded by the service pack installation.

6. The method of claim 5, further comprising:
  determining that a service pack is available for the operating system of the computer system;
  determining that at least one of the two or more applications require the operating system to have the service pack installed to run on the computer system; and
  installing the service pack to the operating system during the upgrade operation.

7. The method of claim 5, wherein determining that one or more service packs is available for at least one of the two or more applications comprises consulting an Internet website to determine the availability of the one or more service packs.

8. The method of claim 5, further comprising prompting the user to accept or refuse installation of the one or more service packs.

9. A computer readable storage medium having stored thereon computer executable instructions which when executed by a processor perform a method of installing service packs in a computer system, the method comprising:
  receiving user input to a computer system that instructs the computer system to commence an upgrade operation for a software suite, the software suite comprising two or more applications, the upgrade operation upgrading at least one of the two or more applications on the computer system;
  determining that one or more service packs is available for at least one of the two or more applications;
  determining whether to install the one or more service packs during the upgrade operation, by performing one of the following:
    determining that a service pack, that is available for a first application in the software suite, is required for the first application to interact with the version of a second application in the software suite to which the second application will be upgraded by the upgrade operation, installing the service pack to the first application, and performing the upgrade operation where the first application is not upgraded by the upgrade operation, instead the first application is upgraded by the service pack installation; or
    determining that a service pack, that is available for a first application in the software suite, fixes a problem that is also fixed by the version of the first application to which the first application will be upgraded by the upgrade operation, selecting not to install the service pack to the first application, and performing the upgrade operation where the first application is upgraded by the upgrade operation and the first application is not upgraded by the service pack installation.

10. The computer readable storage medium of claim 9, wherein the method performed by the execution of the computer executable instructions further comprises:
  determining that a service pack is available for the operating system of the computer system;
  determining that at least one of the two or more applications require the operating system to have the service pack installed to run on the computer system; and
  installing the service pack to the operating system during the upgrade operation.

11. The computer readable storage medium of claim 9, wherein determining that one or more service packs is available for at least one of the two or more applications comprises consulting an Internet website to determine the availability of the one or more service packs.

12. The computer readable storage medium of claim 9, wherein the method performed by the execution of the computer executable instructions further comprises:
  prompting the user to accept or refuse installation of the one or more service packs.

* * * * *